Patented Sept. 13, 1949

2,481,763

UNITED STATES PATENT OFFICE 2,481,763

TECHNIQUE FOR ISOLATING SUBTILIN

Hans Lineweaver, Berkeley, and Alvin A. Klose and Gordon Alderton, Albany, Calif., assignors to United States of America as represented by the Secretary of Agriculture No Drawing. Application February 13, 1948, Serial No. 8,266

4 Claims. (Cl. 167—65)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and use by or for the Government of the United States of America throughout the world for governmental purposes without the payment to us of any royalty thereon.

This invention relates to the separation of subtilin from the aqueous culture in which it has been produced, and has among its objects the obtaining of the subtilin in high yield and in a purified form.

Subtilin is an antibiotic substance which is produced by growing a particular strain of Bacillus subtilis in a suitable aqueous culture medium, such as asparagus juice, molasses, and so forth, according to known procedures. Separation of the produced subtilin from the aqueous culture to give suitable concentrates has been difficult.

In the co-pending application of K. P. Dimick et al., Serial No. 777,843, filed October 3, 1947, now Patent No. 2,476,085, there is described and claimed a process of isolating and purifying subtilin. Our invention represents an improvement over this procedure.

According to the Dimick et al., application, the initial steps in the process disclosed therein involve extracting the acidified culture containing the produced subtilin with an inert organic polar solvent such as butanol. To the polar solvent extract is then added a water-immiscible solvent, such as petroleum ether, and the mixture extracted with acidulated water. The acidulated water extract is then treated with a water-soluble inorganic salt to precipitate the subtilin concentrate.

According to our invention, these initial steps are considerably simplified in that the extraction with acidulated water is omitted. Further, the necessity for using a water-immiscible solvent is also eliminated. Thus our process is simpler and more economical with regard to both labor and reagents. Further, the subtilin produced in our process has a higher potency than the subtilin produced in the aforementioned Dimick et al. process.

In general, our process comprises acidifying an aqueous culture containing subtilin to a pH of about from 1 to 3.5, extracting the subtilin from the thus acidified culture with an inert organic polar solvent having a solubility of about from 5% to 20% in water, such as butanol, separating the resulting polar solvent extract from the culture, adjusting the polar solvent extract so obtained to a pH of about from 4 to 7, and adding thereto a sufficient quantity of a water-soluble inorganic salt. As a result, three phases are formed—a polar solvent phase, a phase of water saturated with inorganic salt, and a solid phase of subtilin concentrate and some inorganic salt. The last-mentioned solid subtilin phase may then be separated from the extract, as by filtration or centrifuging. The material so produced exhibits a high subtilin potency and can be washed to remove the excess of the inorganic salt, dried, and used in some applications, particularly topical applications. However, it is usually preferable to purify it further according to the technique of the Dimick et al. application (omitting, of course, the polar solvent extraction, the addition of water-immiscible solvent, the acidulated water extraction and the salting-out step). Thus, the subtilin concentrate, obtained by contacting the polar solvent extract with inorganic salt, after being washed to remove excess salt and other impurities, is then subjected to a salt fractionation to precipitate impurities and finally to the solution of subtilin so obtained is added a water-soluble inorganic salt to precipitate the purified subtilin. This precipitate is washed and dried and the material is then ready for use.

The following examples disclose particular steps and conditions within the scope of this invention, but it is to be understood that these examples are given only by way of illustration and not limitation.

In the following examples, subtilin was assayed by a short incubation period turbidimetric bacteriostatic method similar to that described by MacMahan [Jour. Biol. Chem., vol. 153, p. 249, 1944] for penicillin. Test organisms included Micrococcus conglomeratus, Staphylococcus aureus, and Streptococcus faecalis. The values of subtilin contents are relative and based on a selected sample of partially purified subtilin, the potency of which was arbitrarily designated as 100%. Thus a reference to a subtilin content of 1.66 equivalent grams means that the sample, irrespective of its weight contains an amount of active material equivalent to 1.66 grams of the standard material. Since the products produced according to this invention are purer than the arbitrary standard, the equivalent subtilin content of many samples is greater than the actual weight of the material obtained. In such cases the relative potency will naturally be above 100%. The arbitrary standard used in these examples was the same as that employed in the aforesaid Dimick et al., application.

EXAMPLE I (a) *Butanol extraction*

Two liters of culture containing subtilin produced by the growth of B. subtilis was adjusted to a pH of 2 by the addition of hydrochloric acid. One liter of normal butanol was added to the acidified culture, the mixture thoroughly agitated and then centrifuged. The butanol phase obtained as a supernatant liquid had a subtilin content of 2.07 equivalent grams.

(b) *Salt precipitation*

The pH of the butanol extract was adjusted to a pH of 5.0 by addition of an aqueous solution of sodium hydroxide and 60 grams of dry sodium chloride (excess over saturation) added. The mixture was thoroughly agitated then allowed to stand in the cold overnight. The next day, the system was observed to have three phases—a butanol phase, an aqueous phase, and a solid phase containing the subtilin. The mixture was filtered to separate the subtilin phase.

(c) *Washing of subtilin precipitate*

The solid phase obtained in step b was washed with one liter of dry normal butanol, then with 10% aqueous sodium chloride to remove excess salt. The washed material was then subjected to a vacuum until it was dry. The dry material had a weight of .85 gram, of which 1.66 equivalent grams was subtilin, i. e., a relative potency of 195%.

EXAMPLE II (a) *Butanol extraction*

366 liters of culture containing subtilin produced by the growth of B. subtilis was adjusted to a pH of 2 by the addition of hydrochloric acid. 132 liters of normal butanol was added to the acidified culture, the mixture thoroughly agitated and then centrifuged. The butanol phase obtained as a supernatant liquid had a subtilin content of 133 equivalent grams.

(b) *Salt precipitation*

The pH of the butanol extract was adjusted to 5.0 by addition of 0.5 N sodium hydroxide solution and 7.75 kilograms of sodium chloride added (about 92% NaCl saturation). The mixture was stirred for two hours then centrifuged to remove the solid phase containing the subtilin.

(c) *Washing of subtilin precipitate*

The solid phase obtained in step (b) was washed with 2 liters of 10% aqueous sodium chloride solution to remove excess salt. The material was then washed with 2.8 liters of absolute alcohol then with 1.4 liters of 95% alcohol.

(d) *Salt fractionation*

The washed precipitate from step c was introduced into 30 liters of water together with sufficient hydrochloric acid to adjust the pH to about 3. The material was left overnight in the cold to insure complete solution. The next day 120 grams of dry sodium chloride was added (0.4% NaCl concentration) to the solution and sufficient sodium hydroxide solution added to adjust the pH to 4.6. The solution was filtered on a standard filter press employing some refined diatomaceous earth as a filter aid.

(e) *Final precipitation of subtilin*

To the filtrate obtained in step d was added sufficient dry sodium chloride to establish a concentration of 10% NaCl. The subtilin which precipitated out was removed by filtration. The filter cake was washed with water until the salt concentration in the wash water was about 1% NaCl. The cake was then washed with absolute alcohol and finally subjected to a vacuum until dry. The material so obtained had a weight of 32.5 grams, of which 65.4 equivalent grams was subtilin, i. e., a relative potency of 201%.

In part a of the above examples, it is preferable to adjust the pH of the culture to the range from about 1 to about 3.5. For such purpose it is preferable to use hydrochloric acid as the acidifying agent, although other mineral acids such as sulphuric, hydrobromic, etc., may be employed. Although normal butanol is the preferred polar solvent, other solvents may be used, for instance isobutyl alcohol, methyl ethyl ketone, normal amyl alcohol, isoamyl alcohol, etc. In general, polar solvents which are soluble to an extent of about 5% to about 20% in water and which have a reciprocal solubility (water in polar solvent) of the same range are suitable. The amount of polar solvent may be varied over wide limits. One-third volume of polar solvent per volume of culture is about the minimum. It is expedient to use about one-third to one-half volume of polar solvent per volume of culture to decrease the quantity of liquid to be handled in subsequent operations. The polar solvent extract may be separated from the culture either by decantation or centrifuging, the latter being preferred.

In part b of the examples the adjustment of the pH of the polar-solvent extract has an important function. In general the pH may be varied from about 4 to about 7. Higher pH levels tend to inactivate the subtilin while at lower pH's, incomplete precipitation of subtilin results. Preferably the pH is adjusted to 5 to 6. For the purpose of adjusting the pH, any of the usual bases or basic materials such as alkali metal hydroxides, ammonium hydroxide, alkali metal carbonates, ammonium carbonates, and so forth, may be used, sodium hydroxide being preferred. Obviously, if the polar-solvent extract is at a pH higher than the desired range then an acid should be added to provide the proper pH. For this purpose it is preferable to use hydrochloric acid although other mineral acids such as sulphuric, hydrobromic, phosphoric, etc. may be used. In order to salt-out the subtilin, any water-soluble inorganic salt such as potassium chloride, magnesium chloride, ammonium chloride, ammonium sulphate, magnesium sulphate, sodium sulphate, potassium sulphate, and so forth, may be used in lieu of sodium chloride. Sodium chloride is preferred, however, the amount added generally being sufficient to establish 90% to 100% NaCl saturation. An excess of the salt over saturation can be added but in such case the subtilin precipitate will contain an excessive amount of the salt. After the phase separation is obtained, the solid subtilin phase can be separated by filtration or centrifuging, the latter being preferred.

In step c of the examples, it is generally advisable to lower the salt concentration in the subtilin precipitate by washing with a dilute aqueous solution of an inorganic salt. Any of the salts referred to in the paragraph relating to part b can be used. Sodium chloride solution is preferred and is generally employed in a concentration of about 10%. It is also advisable to wash the subtilin precipitate with a water-soluble organic solvent such as normal butanol, secondary butanol, tertiary butanol, isobutanol, propanol, isopropanol, acetone, methyl alcohol, and so forth. Ethyl alcohol is generally preferred and may be absolute or may contain up to abolt 10%-15% water.

In part d of the examples the principle of this operation is to establish conditions wherein the subtilin is soluble but the impurities are not. This is done by maintaining a pH of 4.6 and a low concentration of salt. Any of the inorganic salts referred to in the paragraph above relating to part b of the examples may be employed although sodium chloride is preferred. The washed subtilin precipitate from step c can be directly subjected to solution at a pH of 4.6 with the low concentration of salt. In such case however solution of the subtilin is very slow. It is preferred to dissolve the entire precipitate as obtained in step c by using a pH of 3.5 or below. By this technique rapid solution is obtained. The impurities are then precipitated by adding the inorganic salt and adjusting the pH to 4.6 by addition of an alkali metal hydroxide, ammonium hydroxide, alkali metal carbonates or ammonium carbonates. If this rapid technique is used, the initial lowering of the pH to 3.5 or less is accomplished by adding hydrochloric acid, sulphuric acid, hydrobromic acid, or other strong acid.

In part e the precipitation or subtilin can be carried out by adding any of the inorganic salts specified in the paragraph above relating to part b. Sodium chloride is preferred, the amount generally being such as to give a salt concentration from above 6% to about 10%.

The final washing of the subtilin may be carried out in several different ways. The precipitated subtilin may be washed with water until the wash water contains about 1% salt, then washed with absolute alcohol or any of the other solvents referred to in the paragraph above relating to step c to remove the remaining salt. The precipitate may also be washed with water which is made alkaline by addition of an alkali metal hydroxide or ammonium hydroxide. The pH of the alkaline wash water should be from about 6.5 to about 9 to prevent solution of the subtilin.

The subtilin after washing is preferably dried by subjecting it to a vacuum. Such technique is preferable but not essential. The drying may also be accomplished by moderate heating or by merely allowing the material to stand exposed to the air.

Having thus described our invention, we claim:

1. A process comprising acidifying an aqueous culture containing subtilin to a pH of about from 1 to 3.5, extracting the subtilin from the thus acidified culture with an inert organic polar solvent having a solubility of about from 5% to 20% in water, separating the resulting polar solvent extract from the culture, adjusting the polar solvent extract so obtained to a pH of about from 4 to 7 and adding thereto a sufficient quantity of a water-soluble inorganic salt to salt out the subtilin as a solid subtilin phase, separating the solid subtilin phase from the extract, and washing the solid subtilin phase to remove the excess of the inorganic salt.

2. The process of claim 1 whereing the organic polar solvent is butanol.

3. The process of claim 1 wherein the inorganic salt is sodium chloride.

4. The process of claim 1 wherein the organic polar solvent is butanol and the inorganic salt is sodium chloride.

HANS LINEWEAVER.
ALVIN A. KLOSE.
GORDON ALDERTON.

REFERENCES CITED

The following references are of record in the file of this patent:

Jansen et al.: Arch. Biochem., vol. 4, pp. 297–309 (1944).